United States Patent
Avey

(10) Patent No.: US 12,247,662 B2
(45) Date of Patent: Mar. 11, 2025

(54) MODULAR STUFFING BOX

(71) Applicant: GD Energy Products, LLC, Tulsa, OK (US)

(72) Inventor: Adam Bradley Avey, Chicago, IL (US)

(73) Assignee: GD ENERGY PRODUCTS, LLC, Tulsa, OK (US)

( * ) Notice: Subject to any disclaimer, the term of this patent is extended or adjusted under 35 U.S.C. 154(b) by 165 days.

(21) Appl. No.: 18/082,191

(22) Filed: Dec. 15, 2022

(65) Prior Publication Data

US 2024/0200656 A1 Jun. 20, 2024

(51) Int. Cl.
 *F16J 15/18* (2006.01)

(52) U.S. Cl.
 CPC ................... *F16J 15/18* (2013.01)

(58) Field of Classification Search
 CPC ...................................................... F16J 15/18
 See application file for complete search history.

(56) References Cited

U.S. PATENT DOCUMENTS

| | | | | |
|---|---|---|---|---|
| 793,461 A * | 6/1905 | Mossman | ............... | F16J 15/008 277/514 |
| 2,165,845 A * | 7/1939 | France | ............... | F16J 15/26 277/516 |
| 2,856,209 A * | 10/1958 | Watson | ............... | F16J 15/54 277/514 |
| 3,395,923 A * | 8/1968 | Remke | ............... | E21B 33/08 277/512 |
| 3,471,156 A * | 10/1969 | Burns | ............... | E21B 33/08 277/332 |
| 4,623,152 A * | 11/1986 | St Jean | ............... | F16J 15/188 277/518 |
| 4,936,592 A * | 6/1990 | Vaisanen | ............... | F16J 15/184 277/520 |
| 5,398,944 A * | 3/1995 | D'Alfonso | ............... | E21B 33/08 277/346 |
| 6,325,387 B2 * | 12/2001 | Shoemaker | ............... | F16J 15/188 277/519 |
| 10,240,594 B2 | 3/2019 | Barnhouse, Jr. et al. | | |
| D933,104 S | 10/2021 | Ellisor et al. | | |
| D933,105 S | 10/2021 | Ellisor et al. | | |
| 11,391,374 B1 | 7/2022 | Ellisor et al. | | |
| 11,454,321 B2 | 9/2022 | Mullins et al. | | |
| 11,536,267 B2 | 12/2022 | Nowell et al. | | |

(Continued)

FOREIGN PATENT DOCUMENTS

WO 2021195572 A1 9/2021

*Primary Examiner* — Vishal A Patel
(74) *Attorney, Agent, or Firm* — Edell, Shapiro & Finnan, LLC

(57) ABSTRACT

A modular stuffing box for a reciprocating pump, and in particular, an externally mounted modular stuffing box. The modular stuffing box includes three or more sections that can be disassembled in individual sections. Being able to disassemble the sections allows for only the damaged section or sections requiring repair or removal to be replaced, thereby eliminating the need to remove or replace all of the sections of the stuffing box. The overall expenses are reduced and the ease of repair in the field is increased, because the materials and sections of the stuffing box that are in good condition and do not require repair can be reused as part of the stuffing box.

20 Claims, 10 Drawing Sheets

(56) References Cited

U.S. PATENT DOCUMENTS

| | | | |
|---|---|---|---|
| 2007/0273105 A1* | 11/2007 | Stanton | F04B 53/164 |
| | | | 277/500 |
| 2021/0215154 A1* | 7/2021 | Nowell | F04B 1/16 |
| 2022/0163045 A1 | 5/2022 | Meyer et al. | |

* cited by examiner

MODULAR STUFFING BOX

FIELD OF INVENTION

The present invention relates to the field of high pressure reciprocating pumps and, in particular, to a modular stuffing box that is externally mounted to a fluid end casing of a high pressure reciprocating pump.

BACKGROUND

High pressure reciprocating pumps are often used to deliver high pressure fluids during earth drilling operations. Generally, a reciprocating pump includes a power end and a fluid end. The power end can generate forces sufficient to cause the fluid end to deliver high pressure fluids to earth drilling operations. The fluid end may include a casing that defines one or more internal pumping chambers and conduits that define pathways between one or more internal pumping chambers and external surfaces of the fluid end casing.

Stuffing boxes regularly experience abrasive wear and fluid cuts during frac service and operations, which results in several problems for the stuffing boxes. Stuffing boxes that are externally mounted to a fluid end casing or housing can be changed in the field, but are heavy and difficult to handle. When a conventional stuffing box fails, the stuffing box as a whole must be replaced. The cost to repair a failed stuffing box is not economical and is usually cost prohibitive. Also, there are a limited number of materials appropriate for use in stuffing boxes because of the required material strength and corrosion resistance properties due to the service conditions. Abrasion resistant treatments to the internal bore of a stuffing box are limited due to the geometrical constraints of the stuffing box because of its shape and structure.

Thus, there is a need for a stuffing box that overcomes the limitations of conventional stuffing boxes.

SUMMARY

The present application relates to modular stuffing box for a reciprocating pump, and in particular, to an externally mounted stuffing box. The modular stuffing box includes three or more sections that can be disassembled in individual sections. The ability to disassemble the sections allows for only the damaged section or sections requiring repair or removal to be replaced, thereby eliminating the need to remove or replace all of the sections of the stuffing box. That results in reduced overall expenses because the materials and sections of the stuffing box that are in good condition and do not require repair can be reused as part of the stuffing box.

The modular stuffing box sections can be optimized with different properties relative to each other. It may be desired that certain sections be optimized or designed for increased strength and/or increased wear resistance relative to other sections. If strengthening or increasing the wear resistance of a surface is desired, such treatment or properties will incur costs. However, if those properties are not needed through the entire stuffing box, those properties can be localized or focused on one or a few sections, thereby avoiding the costs involved with providing those properties throughout the entire stuffing box.

With the stuffing box sections being removably attached, different sections can be manufactured with different desired properties. For example, the area requiring abrasion resistant treatment will be manufactured separate from the other sections, thereby facilitating easy access for targeted and focused surface treatments and sleeve installations. This arrangement allows for abrasion resistant treatments of the packing bore prone to wear. In summary, the modular stuffing box enables damaged sections to be removed and replaced instead of the entire stuffing box, thereby making servicing in the field easier and reducing overall time and costs for repairs.

More specifically, in accordance with at least one embodiment, the present application is directed to a reciprocating pump including a power end and a fluid end. The power end is configured to generate pumping power and the fluid end is configured to deliver a fluid from an inlet bore to an outlet bore as the power end generates the pumping power.

The present invention relates to a modular stuffing box configured to be coupled to a fluid end casing of a reciprocating pump, the modular stuffing box including a first section including a mounting portion engageable with an opening formed in the fluid end casing, the first section defining a bore therein, a second section separate from the first section, the second section having an inner surface including an abrasion-resistant material, the inner surface defining a bore therein, a third section having an inner surface defining a bore therein, a fastener engageable with each of the first section, the second section, the third section, and the fluid end casing to secure the first section, the second section, and the third section to the fluid end casing such that the bores of the first section, the second section, and the third section are aligned, and one or more packing seals located in the bore of the second section.

In one embodiment, the fastener is removed, any one of the first section, the second section, and the third section can be removed and replaced with a different section having the same features as the removed section. In another embodiment, each of the first section, the second section, and the third section has a mounting hole that can receive the fastener, and the fluid end casing defines a mounting hole that receives the fastener after the fastener is inserted through the mounting holes in the first section, the second section, and the third section. In yet another embodiment, the first section includes a first alignment mechanism, the second section includes a second alignment mechanism engageable with the first alignment mechanism to ensure that the first section and the second section are aligned when they are positioned proximate to each other. In addition, the second section includes a third alignment mechanism, the third section includes a fourth alignment mechanism engageable with the third alignment mechanism to ensure that the second section and the third section are aligned when they are positioned proximate to each other.

In another embodiment, the third section includes a first inner portion defining a first inner surface and a second inner portion defining a second inner surface, the third section including a wall between the first inner portion and the second inner portion, and the first inner surface defines a plurality of threads. In addition, the modular stuffing box includes a packing nut engageable with the third section, the packing nut having an outer surface defining a plurality of threads, the threads on the packing nut being engageable with the threads on the third section to couple the packing nut to the third section and thereby retain the packing seals in the modular stuffing box. The one or more packing seals are located inside the second section when the packing nut is coupled to the third section.

In an alternative embodiment, the second section includes a body having an inner wall with abrasion-resistant properties and the one or more packing seals are aligned with the inner wall of the second section. In another embodiment, the first section includes a body having an outer end and an inner end opposite to the outer end, the mounting portion of the first section is located on the inner end, and the mounting portion includes a circumferential seal. Alternatively, the first section includes a body having an outer end and an inner end opposite to the outer end, the outer end includes a groove formed therein, and the first section includes a sealing member located in the groove.

The present invention also relates to a fluid end component that includes a first component having an inner surface defining a first central bore, a second component having an inner surface defining a second central bore, the inner surface of the second component being abrasion-resistant, a third component having an inner surface defining a third central bore, each of the first component, the second component, and the third component being independent from each other, a plurality of fasteners engageable with each of the first component, the second component, the third component, and the casing to mount the first component, the second component, and the third component to a fluid end casing, and one or more packing seals retainable in the fluid end component.

In one embodiment, the inner surface of the third component includes a plurality of threads, and the fluid end component includes a packing nut with a plurality of threads engageable with the plurality of threads on the third component to mount the packing nut to the third component and retain the one or more packing seals in the fluid end component. In another embodiment, the first component and the second component include a first set of cooperating alignment mechanisms that engage each other when the first component and the second component are proximate each other, and the second component and the third component include a second set of cooperating alignment mechanisms that engage each other when the second component and the third component are proximate each other. In an alternative embodiment, the first central bore has a first diameter, the second central bore has a second diameter, and a portion of the third central bore has a third diameter, wherein the second diameter and the third diameter are the same and are larger than the first diameter. In yet another embodiment, the first component has an end with a groove containing a sealing member that engages the second component when the first component and the second component are engaged with each other, and the third component has an end with a groove containing a sealing member that engages the second component with the third component and the second component are engaged with each other.

The present invention also relates to a stuffing box configured to be removably mounted to a fluid end casing of a reciprocating pump. The stuffing box includes a first section with an inner wall defining a bore, a second section with an inner wall defining a bore, the second section being separate from and movable proximate to the first section, a third section with an inner wall defining a bore, the third section being separate from and movable proximate to the second section, one or more packing seals locatable in at least one of the first section, the second section, or the third section, and a fastener engageable with each of the first section, the second section, the third section to mount the first section, the second section, and the third section to the casing, wherein any of the first section, the second section, and the third section is removable and replaceable by a similarly structured section.

In one embodiment, the inner wall of the second section is abrasion-resistant, the inner wall of the third section includes threads, and the stuffing box includes a packing nut with threads engageable with the threads on the third section to secure the packing nut to the third section. In another embodiment, each of the first section, the second section, and the third section includes an alignment mechanism that engages an alignment mechanism of an adjacent one of the first section, the second section, and the third section to align the bores of the first section, the second section, and the third section. In yet another embodiment, each of the inner walls of the first section, the second section, and the third section has a different surface and a different configuration than the inner walls of other sections.

The foregoing advantages and features will become evident in view of the drawings and detailed description.

BRIEF DESCRIPTION OF THE DRAWINGS

To complete the description and in order to provide for a better understanding of the present application, a set of drawings is provided. The drawings form an integral part of the description and illustrate embodiments of the present application, which should not be interpreted as restricting the scope of the invention, but just as examples. The drawings comprise the following figures.

Like reference numerals have been used to identify like elements throughout this disclosure.

DETAILED DESCRIPTION

The following description is not to be taken in a limiting sense but is given solely for the purpose of describing the broad principles of the invention. Embodiments of the invention will be described by way of example, with reference to the above-mentioned drawings showing elements and results according to the present invention.

The present application relates to modular stuffing box for a reciprocating pump, and in particular, to an externally mounted stuffing box. The modular stuffing box includes three or more sections that can be disassembled in individual sections. The ability to disassemble the sections allows for only the damaged section or sections requiring repair or removal to be replaced, thereby eliminating the need to remove or replace the entire stuffing box. That feature results in reduced overall expenses because the materials and sections of the stuffing box that are in good condition and do not require repair can be reused as part of the stuffing box.

In one embodiment, the invention includes three or more sections that can be assembled into a stuffing box for a reciprocating pump. Each section can be optimized for certain material properties, geometrical properties, and/or costs according to its individual function and location within the stuffing box. The sections can also be replaced independent of one another. For example, if the section containing packing nut threads is damaged, that section can be replaced without removing the remaining sections of the stuffing box from the fluid end assembly or casing. Push-off bolts and related holes or other mechanical structures may assist with the separation and removal of individual sections. In addition, the stuffing box sections may be aligned with each other using dowels, posts, or pins or other mechanical structures to ensure sufficient concentricity of the internal bore is maintained. Alignment features may be positioned such that sections are prevented from being assembled in the incorrect order.

Sealing to prevent debris from entering the stuffing box is accomplished between sections with a gasket, an O-ring, a seal, or other sealing member and is facilitated by a high clamping force generated by the tightening of fasteners mounted through holes in each of the sections. In one embodiment, one or more of the sections may be outfitted with an abrasion-resistant lining, coating, or sleeve to increase the service life of the assembly when used with abrasive fluids, as in a frac service. The abrasion-resistant section will house one of more seals of the packing assembly, not only resisting wear, but also being replaceable in the case of eventual failure.

Figure 1:
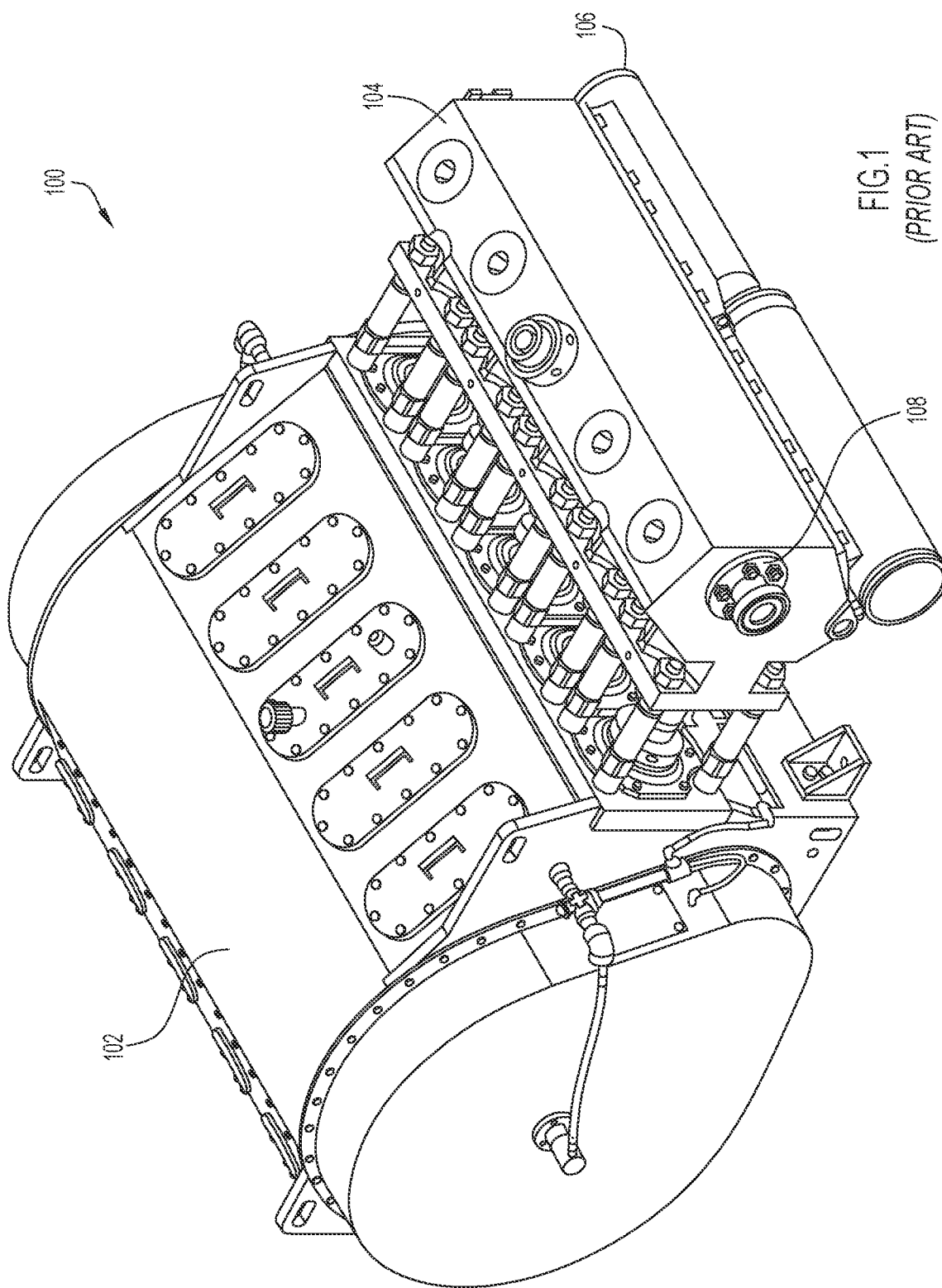
FIG. 1 is a front perspective view of a prior art reciprocating pump including a fluid end and a power end.

Referring to FIG. 1, a prior art reciprocating pump 100 is illustrated. The reciprocating pump 100 includes a power end 102 and a fluid end 104. The power end 102 includes a crankshaft that drives a plurality of reciprocating plungers or pistons (generally referred to as "reciprocating elements") within the fluid end 104 to pump fluid at high pressure (e.g., to cause the fluid end 104 to deliver high pressure fluids to earth drilling operations). For example, the power end 102 may be configured to support hydraulic fracturing (i.e., fracking) operations, where fracking liquid (e.g., a mixture of water and sand) is injected into rock formations at high pressures to allow natural oil and gas to be extracted from the rock formations. However, to be clear, this example is not intended to be limiting and the present application may be applicable to both fracking and drilling operations. At the same time, the present invention may also offer some specific advantages for hydraulic fracturing, which may be noted herein where applicable.

In any case, often, the reciprocating pump 100 may be quite large and may, for example, be supported by a semi-tractor truck ("semi") that can move the reciprocating pump 100 to and from a well. Specifically, in some instances, a semi may move the reciprocating pump 100 off a well when the reciprocating pump 100 requires maintenance. However, a reciprocating pump 100 is typically moved off a well only when a replacement pump (and an associated semi) is available to move into place at the well, which may be rare. Thus, often, the reciprocating pump is taken offline at a well and maintenance is performed while the reciprocating pump 100 remains on the well. If not for this maintenance, the reciprocating pump 100 could operate continuously to extract natural oil and gas (or conduct any other operation). Consequently, any improvements that extend the lifespan of components of the reciprocating pump 100, extend the time between maintenance operations (i.e., between downtime), and/or minimize the time needed to complete maintenance operations (minimizing downtime) are highly desirable.

Figure 2:
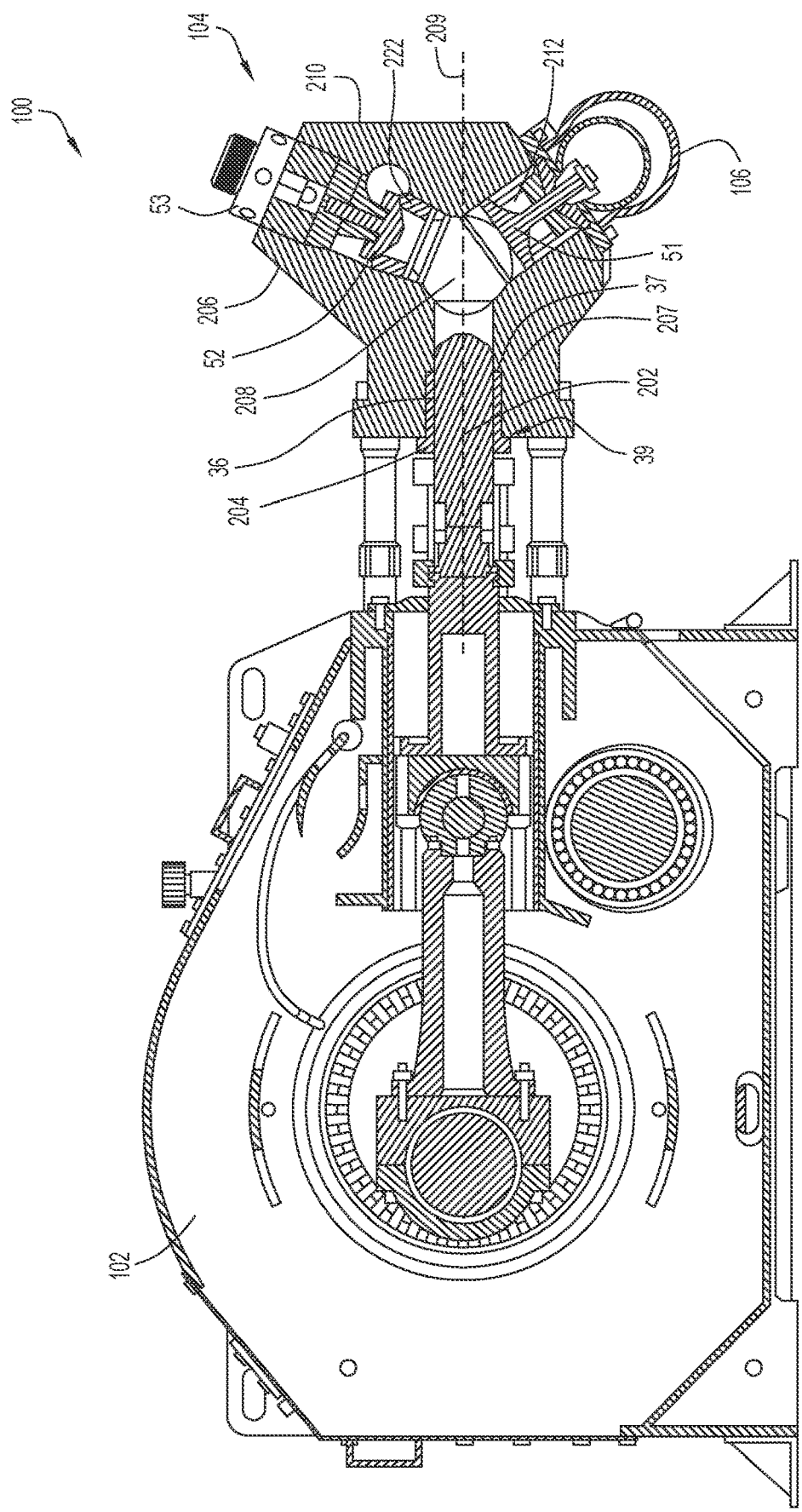
FIG. 2 is a side cross-sectional view of the prior art reciprocating pump illustrated in FIG. 1.

Still referring to FIG. 1, but now in combination with FIG. 2, the reciprocating pump 100 pumps fluid into and out of pumping chambers 208. FIG. 2 shows a side, cross-sectional view of reciprocating pump 100 taken along a central axis 209 of one of the reciprocating elements 202 included in reciprocating pump 100. Thus, FIG. 2 depicts a single pumping chamber 208. However, it should be understood that a fluid end 104 can include multiple pumping chambers 208 arranged side-by-side. In fact, in at least some embodiments (e.g., the embodiment of FIG. 1), a casing 206 of the fluid end 104 forms a plurality of pumping chambers 208 and each chamber 208 includes a reciprocating element 202 that reciprocates within the casing 206. However, side-by-side pumping chambers 208 need not be defined by a single casing 206. For example, in some embodiments, the fluid end 104 may be modular and different casing segments may house one or more pumping chambers 208. In any case, the one or more pumping chambers 208 are arranged side-by-side so that corresponding conduits are positioned adjacent each other and generate substantially parallel pumping action. Specifically, with each stroke of the reciprocating element 202, low pressure fluid is drawn into the pumping chamber 208 and high pressure fluid is discharged. But, often, the fluid within the pumping chamber 208 contains abrasive material (i.e., "debris") that can damage seals formed in the reciprocating pump 100, such as the "packing seals" surrounding a reciprocating element 202 of a fracking fluid end, creating a need for continued maintenance.

In various embodiments, the fluid end 104, and specifically the fluid end casing 206, may be shaped differently and/or have different features, but may still generally perform the same functions, define similar structures, and house similar components. For example, while fluid end 104 includes a first bore 204 that intersects an inlet bore 212 and an outlet bore 222 at skewed angles, other fluid ends may include any number of bores arranged along any desired angle or angles, for example, to intersect bore 204 (and/or an access bore) substantially orthogonally and/or so that two or more bores are substantially coaxial. Generally, bores 212 and 222, as well as any other bores (i.e., segments, conduits, etc.), may intersect to form a pumping chamber 208, may be cylindrical or non-cylindrical, and may define openings at an external surface 210 of the casing 206. Additionally, bores 212 and 222, as well as any other bores (i.e., segments, conduits, etc.), may receive various components or structures, such as sealing assemblies or components thereof.

In the depicted embodiment, inlet bore 212 defines a fluid path through the fluid end 104 that connects the pumping chamber to a piping system 106 delivering fluid to the fluid end 104. Meanwhile, outlet bore 222 allows compressed fluid to exit the fluid end 104. Thus, in operation, bores 212 and 222 may include valve components 51 and 52, respectively, (e.g., one-way valves) that allow bores 212 and 222 to selectively open and deliver a fluid through the fluid end 104. Typically, valve components 51 in the inlet bore 212 may be secured therein by a piping system 106 (see FIG. 1).

Meanwhile valve components 52 in outlet bore 222 may be secured therein by a closure assembly 53 that, in the prior art example illustrated in FIG. 2, is removably coupled to the fluid end 104 via threads.

In operation, fluid may enter fluid end 104 via outer openings of inlet bores 212 and exit fluid end 104 via outer openings of outlet bores 222. More specifically, fluid may enter inlet bores 212 via pipes of piping system 106, flow through pumping chamber 208 (due to reciprocation of a reciprocating elements 202), and then flow through outlet bores 222 into a channel 108 (see FIG. 1). However, piping system 106 and channel 108 are merely example conduits and, in various embodiments, fluid end 104 may receive and discharge fluid via any number of pipes and/or conduits, along pathways of any desirable size or shape.

Meanwhile, each of bores 204 defines, at least in part, a cylinder for reciprocating elements 202, and/or connects the casing 206 to a cylinder for reciprocating elements 202. More specifically, in the illustrated embodiment, a casing segment 207 houses a packing assembly 36 configured to seal against a reciprocating element 202 disposed interiorly of the packing assembly 36 and prevent fluid from leaking through reciprocation or reciprocating bore 204. Reciprocation of a reciprocating element 202 in or adjacent to bore 204, which may be referred to as a reciprocation bore (or, for fracking applications, a plunger bore), draws fluid into the pumping chamber 208 via inlet bore 212 and pumps the fluid out of the pumping chamber 208 via outlet bore 222. However, over time, the packing assembly 36 will wear and/or fail, and thus, must be accessed for maintenance and/or replacement. Other components, such as valve components 51 and/or 52, or the fluid end casing 206 itself may also wear and/or fail and require repair or replacement over time. To help provide access to these parts and/or the pumping chamber, some fluid ends have access bores that are often aligned with (and sometimes coaxial with) the reciprocating bore 204. Other fluid ends needs not include access bore and, thus, such an access bore is not illustrated in FIGS. 1 and 2.

Regardless of whether the fluid end includes an access bore, the packing assembly 36 typically needs to be replaced from an outer opening of bore 204 (i.e., a side of bore 204 aligned with the external surface 210 of the casing 206). At the same time, to operate properly, the packing assembly 36 must be securely positioned around the reciprocating element 202, either in or proximate to the reciprocation bore 204. Thus, in many prior art embodiments, the reciprocation bore 204 defines a stuffing box 37, e.g., in the form of a stepped cavity wall. Then, a closure component 39, such as a sleeve or retaining nut, retains the packing assembly 36 (e.g., a set of packing rings) in the stuffing box 37. Alternatively, in some prior art embodiments, a removable stuffing box is removably coupled to a fluid end and defines, or at least partially defines, a stuffing box 37 for a packing assembly 36. However, since the packing assembly 36 often wears much faster than then removable stuffing box, the removable stuffing box must be openable to allow the packing assembly 36 to be replaced or repaired. Thus, removable stuffing boxes are often removably sealed by a component, such as a retaining nut (also referred to as a gland nut) that is removably attachable to the removable stuffing box.

In the former instances (e.g., where a closure component 39 retains the packing assembly 36 in a stuffing box 37 defined by the fluid end 104), the closure component 39 may experience a high load of forces (i.e., high stress). Thus, the closure component 39 must be tightly and securely coupled to the fluid end casing 206, e.g., with threads and/or bolts, and may wear out quickly over time. Meanwhile, in the latter instances (e.g., where a removable stuffing box is removably coupled to a fluid end casing), both the removable stuffing box and the closure component 39 (e.g., a retaining or gland nut) may experience a high load of forces. Thus, the removable stuffing box must be tightly and securely coupled to the fluid end casing 206, e.g., with threads and/or bolts, and the closure component 39 (e.g., a retaining or gland nut) must be tightly and securely coupled to the removable stuffing box. But, even with such connections, portions of the removable stuffing box and the closure component 39 may wear out quickly over time.

Figure 3:
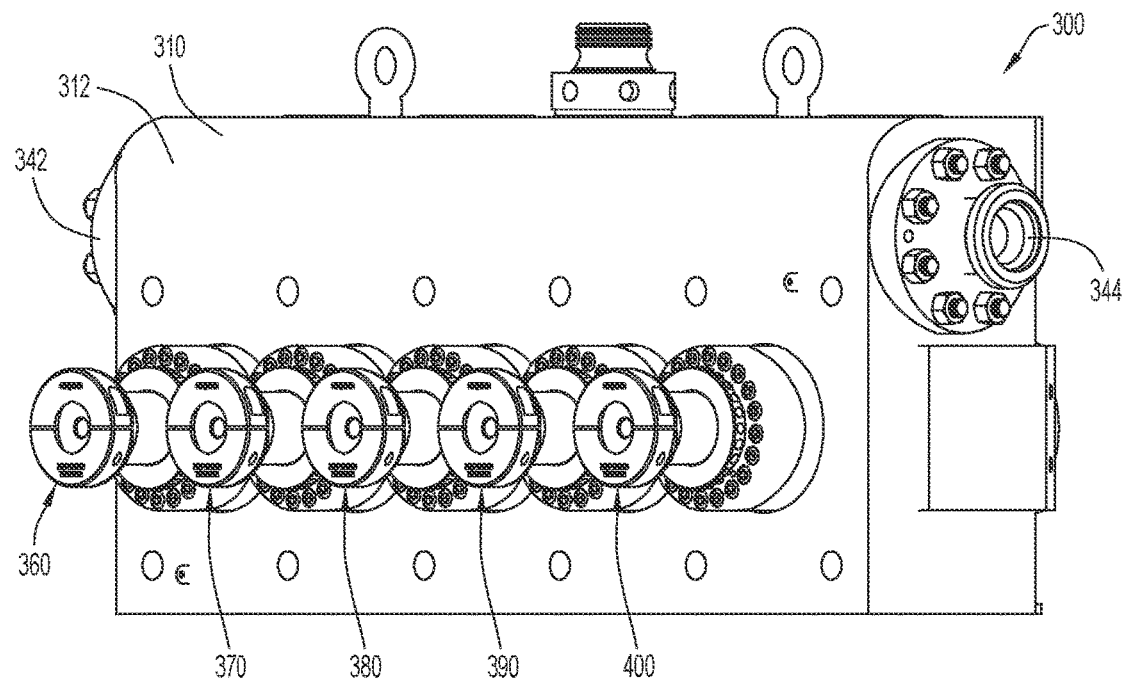
FIG. 3 is a front perspective view of a portion of a fluid end of a reciprocating pump according to an example embodiment of the present invention.
Figure 4:
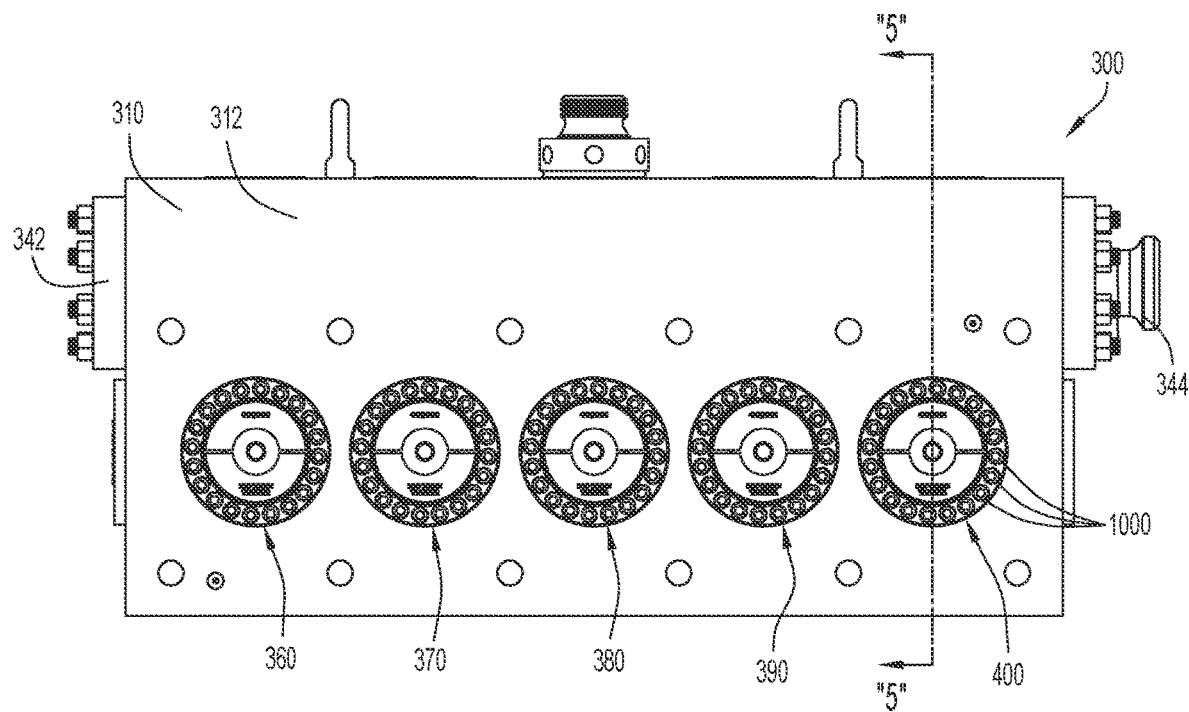
FIG. 4 is a front view of the portion of the fluid end illustrated in FIG. 3.

Now turning to FIGS. 3 and 4, the present application provides a fluid end component or modular stuffing box that can be coupled to a fluid end casing. In FIGS. 3 and 4, a front perspective view and a front view of an embodiment of a fluid end 300 of a reciprocating pump is illustrated. In this embodiment, the fluid end 300 of the reciprocating pump includes a casing or housing 310. Housing 310 includes a fluid end face 312 that has several reciprocating bores in which reciprocating members, such as pistons or plungers, coupled to the power end of the pump are located.

Coupled to housing 310 are several fluid end components 360, 370, 380, 390, and 400. In one embodiment, the fluid end components 360, 370, 380, 390, and 400 are modular stuffing boxes, each of which is proximate to and associated with one of the reciprocating bores. As discussed below, retaining members or fasteners are used to couple respective ones of the fluid end components 360, 370, 380, 390, and 400 to the housing 310. The fluid end casing or housing 310 also includes an inlet connection 342 and an outlet connection 344.

Figure 5:
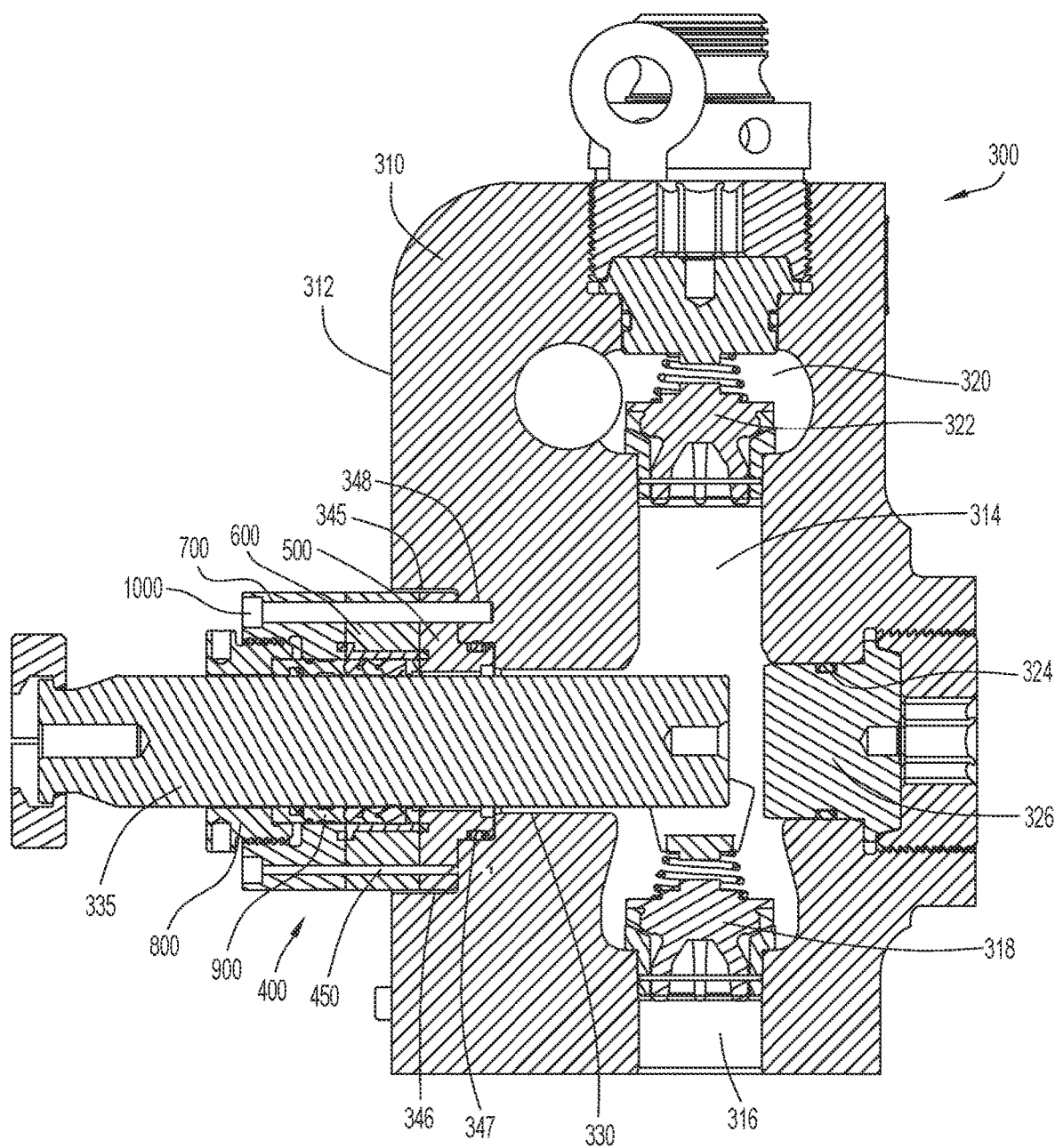
FIG. 5 is a cross-sectional side view of the fluid end illustrated in FIG. 4 taken along the line "5-5" in FIG. 4.

Referring to FIG. 5, a cross-sectional side view of the fluid end casing or housing 310 taken along line "5-5" in FIG. 4 is illustrated. As shown, casing 310 includes an internal fluid cylinder 314 that is in fluid communication with an inlet bore 316, an outlet bore 320, a service bore 324, and a reciprocating bore 330. In some embodiments, the casing 310 does not include the service bore 324. The casing 310 also includes a valve 318 operably mounted in the inlet bore 316, a valve 322 operably mounted in the outlet bore 320, and a valve 326 mounted in the service bore 324. In addition, a reciprocating member 335 is operably mounted in the reciprocating bore 330.

Also shown in FIG. 5 is a cross-sectional side view of the fluid end component 400, which in this embodiment is a modular stuffing box that has several different sections or components. In this embodiment, the fluid end component 400 includes a first section or component 500 that is proximate to the fluid end casing 310. First section 500 can be referred to alternatively as a fluid end interface section. The fluid end component 400 also includes a second section or component 600 that is placeable into engagement with the first section 500. The second section 600 can be referred to alternatively as an abrasion-resistant section, as described in greater detail below. Also, the fluid end component 400 includes a third section or component 700 that is placeable into engagement with the second section 600. The third section 700 can be referred to alternatively as a packing nut thread section. The fluid end component 400 also includes a packing nut 800 that can be coupled to the third section 700, and packing 900 that is locatable in the fluid end component 400.

As described below, several fasteners 1000 are used to mount the fluid end component 400 to the fluid end casing 310. A few of the fasteners 1000 are illustrated in FIG. 4, and one of the fasteners 1000 is illustrated in FIG. 5. Each of the first section 500, the second section 600, and the third section 700 includes several through holes formed therein. Fasteners 1000, such as bolts or studs, are inserted in the through holes in sections 500, 600, and 700 and into a mounting hole 348 formed in casing 310. The fasteners 1000 can be tightened to secure the first section 500, the second section 600, and the third section 700 proximate to each other and to mount them to the casing 310.

In one embodiment, the fluid end casing 310 includes a mounting bore 345 with stepped portions 346 and 347 having different diameters formed therein (see FIG. 5). The mounting bore 345 receives the first section 500 of the fluid end component 400 with part of the first section 500 extending into the smaller diameter portion 347 and the remainder of the first section 500 being located in the larger diameter portion 346. In addition, a portion of the second section 600 extends into the larger diameter portion 346 as well.

Each of the sections 500, 600, and 700 of the fluid end component 400 has a push-off bolt hole formed therethrough, as described in detail below. When the sections 500, 600, and 700 are mounted, they are oriented so that the push-off bolt hole in each of the sections 500, 600, and 700 are not aligned. By not being aligned, the push-off bolt holes enable the insertion of a push-off bolt that passes only through the hole in the outermost section until it engages the outer surface of the second most section. As a result, the push-off bolt is used to help decouple or detach the sections 500, 600, and 700 from the fluid end casing 310 after the fasteners 1000 are removed. As discussed below, each of the sections 500, 600, and 700 includes one or more alignment mechanisms that are used to confirm the alignment of the sections 500, 600, and 700 when assembled to form the fluid end component 400. In operation, section 700 pushes off section 600, which in turn pushes off section 500, which in turn pushes off the fluid end casing 310.

Figure 6:
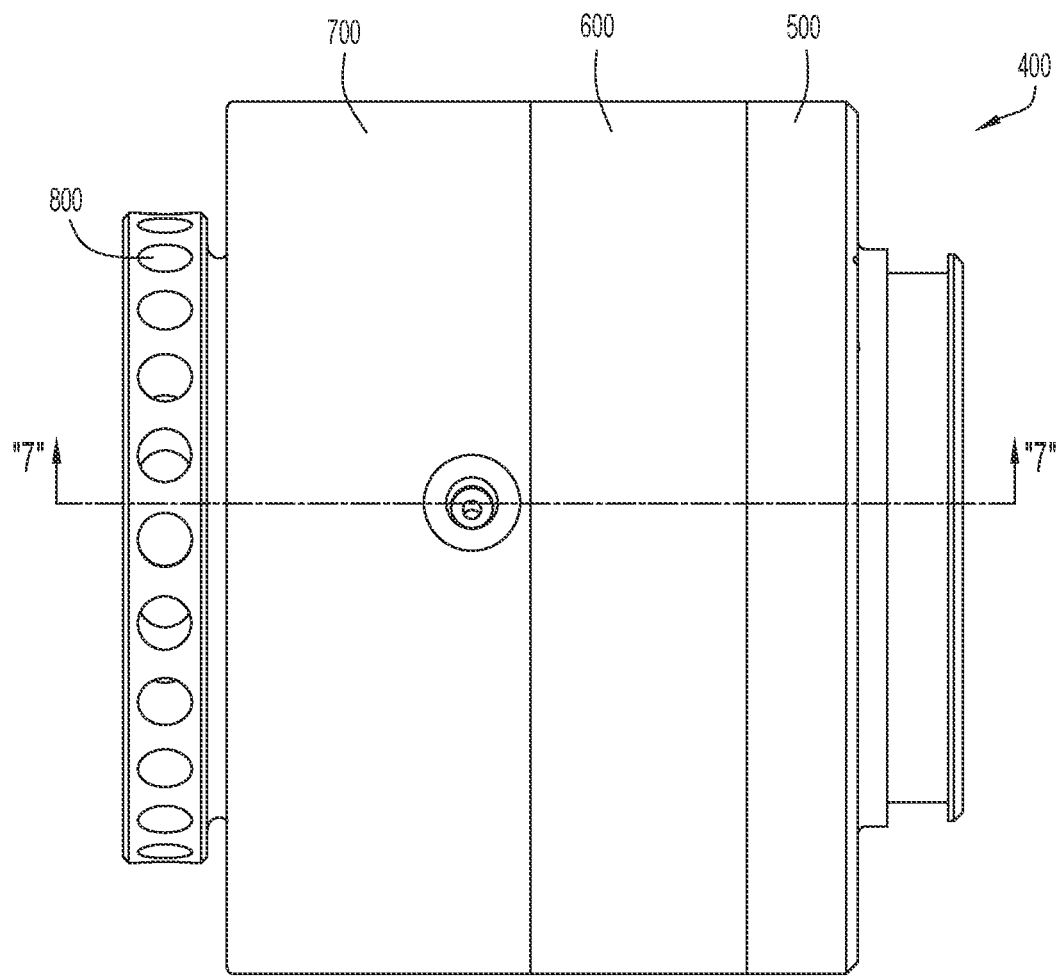
FIG. 6 is a top view of an embodiment of an assembled fluid end component that can be coupled to the fluid end casing illustrated in FIG. 3.

Referring to FIG. 6, a side view of the assembled fluid end component 400 is illustrated. In this view, the first section 500, the second section 600, the third section 700, and the packing nut 800 are coupled together. In this embodiment, the outer diameter of each of the first section 500, the second section 600, and the third section 700 is same. As a result, the outer surfaces of each of the sections 500, 600, and 700 collectively form a continuous outer surface for the fluid end component.

Figure 7:
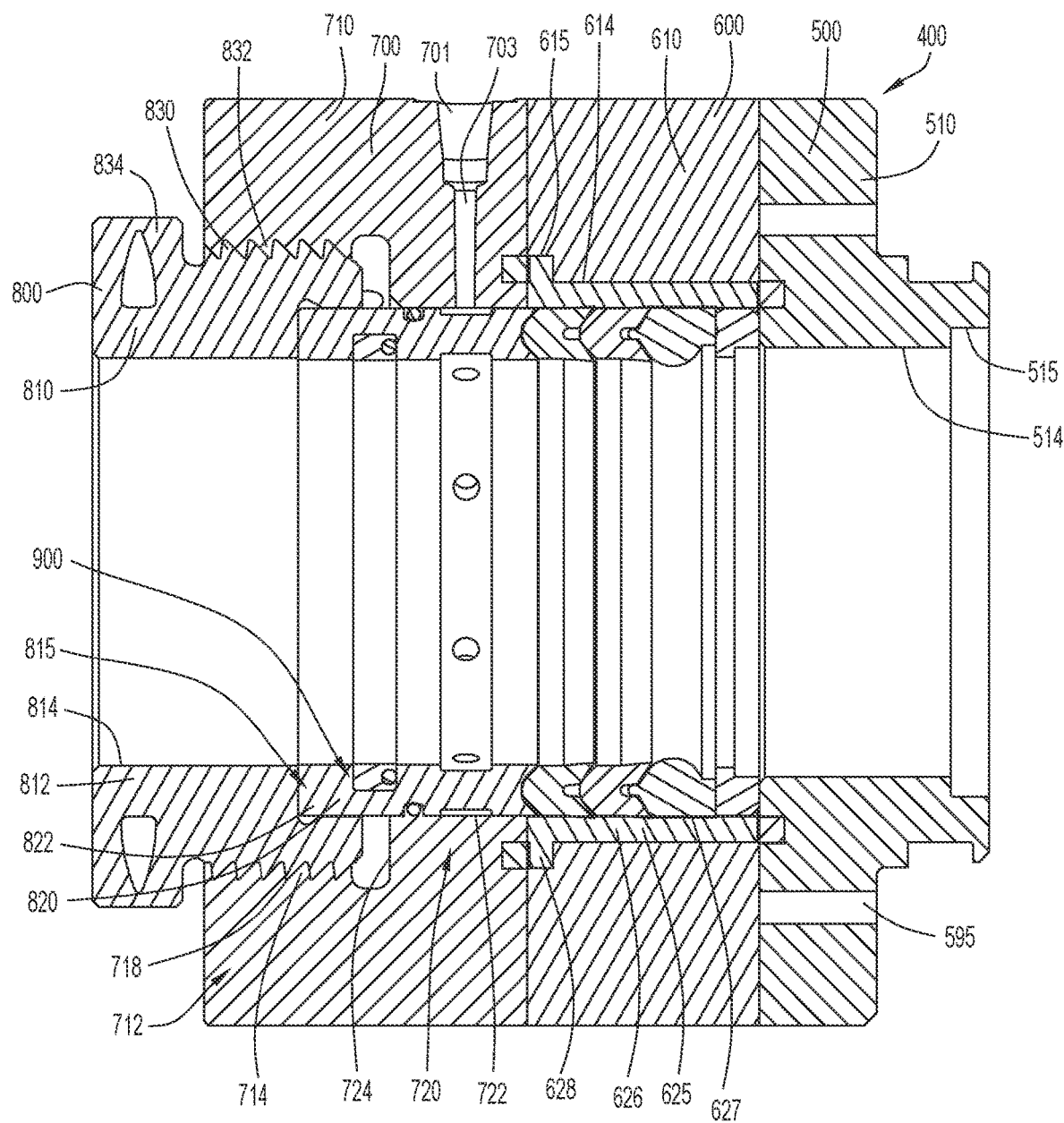
FIG. 7 is a cross-sectional side view of the assembled fluid end component illustrated in FIG. 6 taken along the line "7-7" in FIG. 6.
Figure 10:
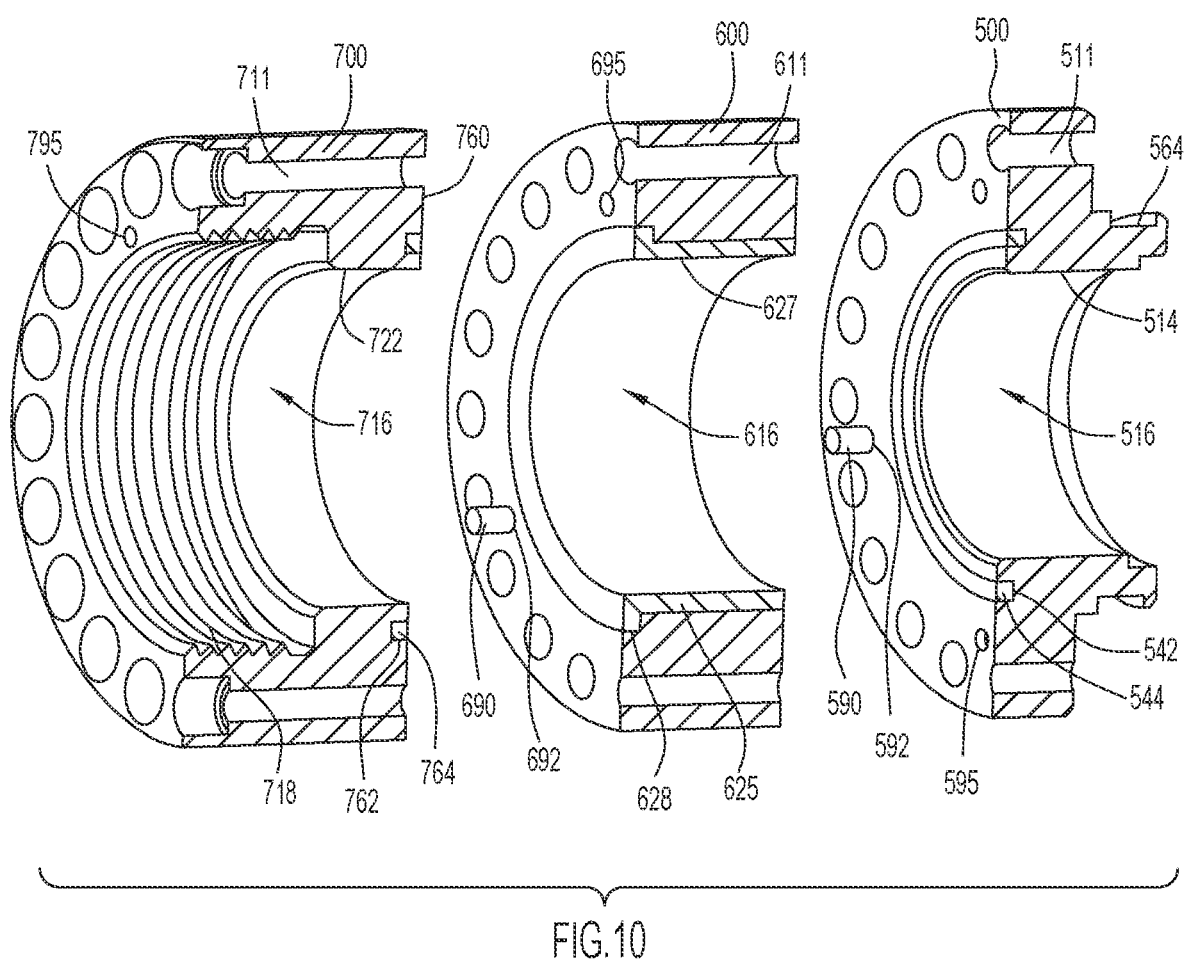
FIG. 10 is an exploded outer side cross-sectional perspective view of some of the components of the fluid end component illustrated in FIG. 6.

Turning to FIG. 7, a cross-sectional side view of the assembled fluid end component 400 is illustrated. The side view is taken along the line "7-7" in FIG. 6. While this cross-sectional view does not show the fastener holes in each of the sections, the fastener holes are illustrated in FIG. 10. Returning to FIG. 7, the first section 500 includes a body 510 with an inner surface 514 and a stepped groove 515 proximate to one end of the body 510. The body 510 also includes push-off bolt holes 595, two of which are illustrated in this view.

The second section 600 also includes a body 610 with an inner surface 614 and a stepped groove 615 proximate to one end of the body 610. In this embodiment, the inner surface 614 defines a bore that has a slightly larger diameter than a bore defined by the inner surface 514 of first section 500. The second section 600 includes a surface 627 that is formed of or includes an abrasion-resistant material. The abrasion-resistant material of surface 627 can be an abrasion-resistant coating or layer of material applied to the inner surface of the second section 600. Alternatively, in one embodiment, the abrasion-resistant material can be included on the inner surface of the second section 600 by providing and inserting a sleeve or cylinder that is either made of an abrasion-resistant material or has a coating or layer of abrasion-resistant material thereon. This alternative embodiment is illustrated in FIG. 7, in which the sleeve 625 includes a cylindrical portion 626 that has an inner surface 627. The inner surface 627 defines a bore that has a larger diameter than the bore defined by inner surface 514 of first section 500. Located at one end of the cylindrical portion 626 is a flange 628 that extends radially outward. When the sleeve 625 is inserted into second section 600, the outer surface of the cylindrical portion 626 engages the inner surface 614 of the body 610 and the flange 628 engages the groove 615. The sleeve 625 provides the second section 600 with abrasion-resistant properties. As mentioned above, in different embodiments, the sleeve 625 can be replaced with an abrasion-resistant coating or lining that is applied to the inner surface 614 of body 610, which can be expanded inwardly to have the same inner diameter as the surface 627 does in FIG. 7.

The third section 700 also includes a body 710 with a first inner portion 712 and a second inner portion 720. The first inner portion 712 includes an inner surface or wall surface 714 that has an inner diameter. The second inner portion 720 also includes an inner surface or wall surface 722 that has an inner diameter that is smaller than the inner diameter of the first inner portion 712. Located between the first inner portion 712 and the second inner portion 720 is a wall 724 that is oriented substantially perpendicular to the inner surfaces 714 and 722. The wall 724 limits the advancement of the packing nut 800 into the third section 700 when it is coupled thereto, as described below. The inner surface 712 includes a set of threads 718 formed thereon, which are used for the coupling of the packing nut 800.

In the illustrated embodiment, the third section 700 includes a packing lubrication port 701 and passageway 703 formed therein. The port 701 and passageway 703 pass from the outer surface of the third section 700 to the inner surface of the third section 700, thereby connecting the outer diameter of the third section 700 with the inner diameter of the third section 700. A user can provide a lubricant to the inner surface of the stuffing box 400 via the port 701 and passageway 703.

The packing nut 800 includes a body 810 with a first inner portion 812 with an inner surface 814 and a second inner portion 820 with an inner surface 822. The body 810 includes a groove 815 that is formed by the difference in inner diameter of the inner surfaces 814 and 822. The inner diameter of the bore formed by the first inner portion 812 is smaller than the inner diameter of the bore formed by the second inner portion 820. In this embodiment, the difference in those inner diameters is the width or thickness of the packing 900 which, as shown in FIG. 7, is located in the groove 815. The body 810 of the packing nut 800 also has an outer surface 830 that has a set of threads 832 formed therein. The threads 832 on body 810 engage with the threads 718 on body 710 when the packing nut 800 is inserted into the third section 700. The sets of threads 832 and 718 couple the packing nut 800 to the third section 700 so that the packing nut 800 retains the packing 900 in the fluid end component 400.

Figure 7A:
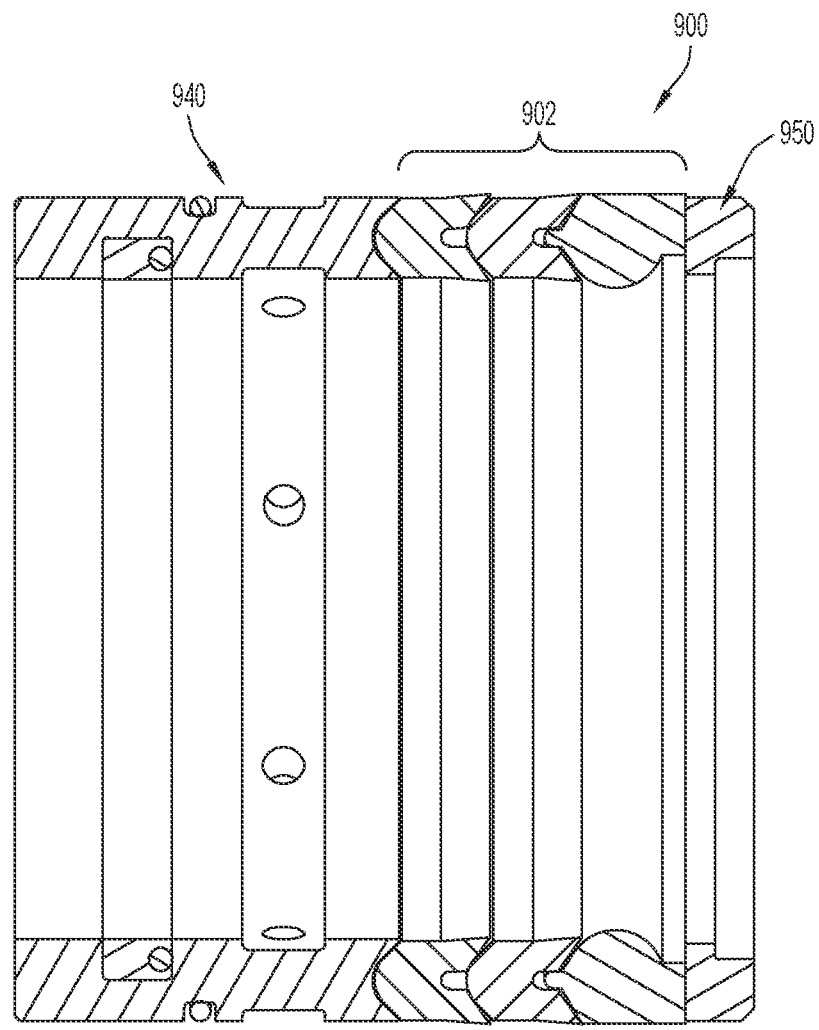
FIG. 7A is a cross-section side view of some of the sealing-related components illustrated in FIG. 7.

Referring to FIG. 7A, an embodiment of a packing 900 is illustrated. In this embodiment, a packing 900 is installed directly into the second section 600 without a sleeve therebetween, but this is not intended to be limiting. In fact, packing 900 may implement the techniques presented herein when installed without a sleeve, when installed within a sleeve-style sealing assembly, or when installed within a conventional sleeve. Thus, packing 900 may realize the advantages of the techniques presented herein in a variety of situations/arrangements.

In the illustrated embodiment, packing 900 extends around a plunger (not shown), within stuffing box 400. The packing 900 includes a number of sealing and/or scraping elements that are generally denoted herein as packing elements 902 and these packing elements 902 are axially secured within the stuffing box 400 by one or more lantern rings 940 and a junk ring 950. The junk ring 950 extends between the seals 900 and the packing nut 800, and compresses the seals and can receive and distribute lubricant to the seals. In the depicted embodiment, the packing elements 902 include three rings. However, this is merely an example and in other embodiments, packing elements 902 may include any number of rings in any order or combination and any of the rings may include any desirable features or structures. Regardless of the number, shape, size, and/or configuration of rings in the packing elements 902, the one or more lantern rings 940 are disposed downstream of the packing elements 902. Meanwhile, the junk ring 950 disposed upstream of the packing elements 602, between the packing elements 602 and the packing nut or retaining element 800 which, in the depicted embodiment, is secured to the third section 700 of stuffing box 400 via threads. Thus, the one or more lantern rings 940 and a junk ring 950 axially enclose (i.e., axially sandwich) the packing elements 902 in the stuffing box 400.

For the purposes of this application, the one or more lantern rings 940 and the junk ring 950 may be referred to as seal carriers. This is because the one or more lantern rings 940 and the junk ring 950 may control an axial position of seals formed by the packing elements 902. Consequently, the one or more lantern rings 940 and the junk ring 950 may serve an analogous purpose to and/or be reconfigured in the same manner as a seal carrier. On the other hand, for the purposes of this application the reciprocating element or plunger may be referred to as a movable closure element. This is because the one or more lantern rings 940, the junk ring 950, and the packing elements 902 extend around the plunger 335 and cooperate with the plunger 335 to close segment the bore. Thus, collectively, the packing 900 and the plunger 335 may form a sealing assembly that can function in accordance with, and realize the advantages of, the techniques presented herein.

With that terminology in mind, in the illustrated configuration, the junk ring 950 and one or more lantern rings 940 position the packing elements 902 in an axial position within the stuffing box 400. In this position, the packing elements 902 seal against a portion of the inside of the second section 600 (see FIG. 7), which has an abrasion-resistant material on its inner surface proximate to the packing elements 902. This position helps extend the life of the stuffing box because the most abrasion is created adjacent the packing elements 902. Additionally, in that position, the packing elements 902 may also seal against a portion of reciprocating member 335. In this embodiment, if the second section 600 needs to be repaired or replaced due to wear, it can be removed in a manner similar to that described herein.

Figure 8:
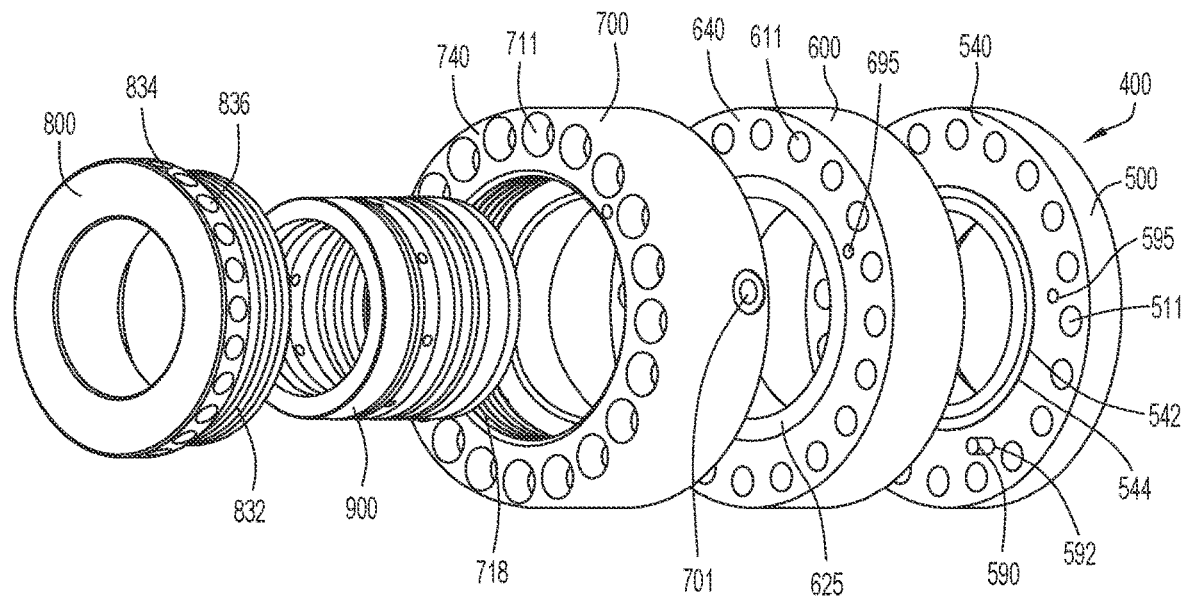
FIG. 8 is an exploded outer side perspective view of the components of the fluid end component illustrated in FIG. 6.
Figure 9:
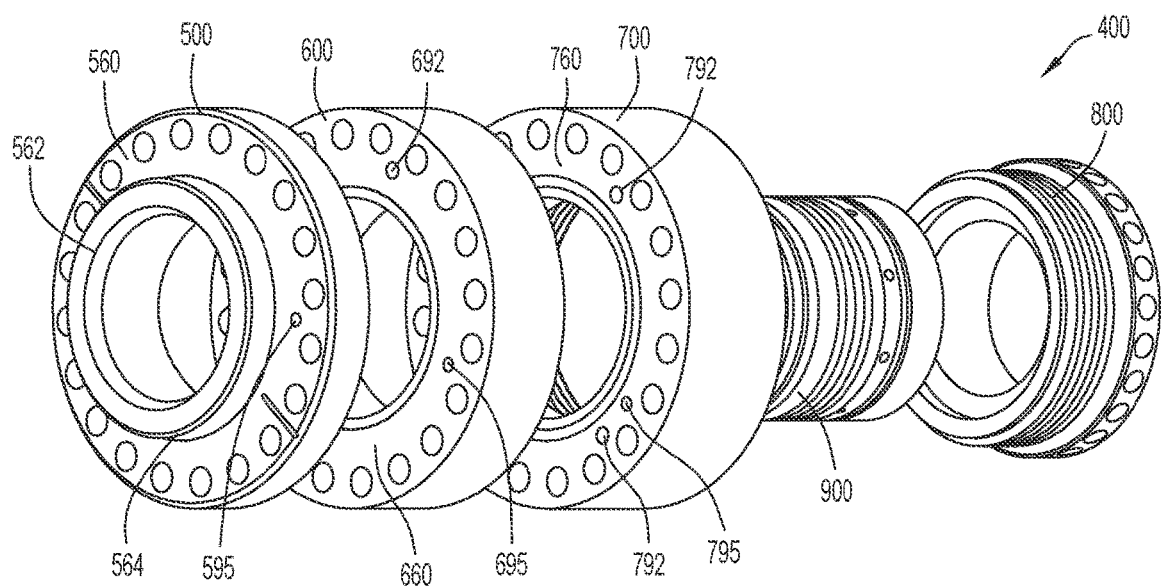
FIG. 9 is an exploded inner side perspective view of the components of the fluid end component illustrated in FIG. 6.

Turning to FIGS. 8 and 9, exploded views of the components of the fluid end component 400 are illustrated from different perspectives. Referring to FIG. 8 first, an outer perspective exploded view of the fluid end component 400 is shown. The through holes 511, 611, and 711 of the first section 500, second section 600, and third section 700, respectively, are illustrated in this view.

The body 510 of the first section 500 includes an outer end 540 that has a surface in which a circular groove 542 is formed. Located in the groove 542 is a seal or sealing member 544, which can be any resilient material or member. When the first section 500 and the second section 600 are coupled to and in engagement with each other, the seal 544 engages an inner end of second section 600, thereby preventing debris from entering into the bore of the fluid end component 400. In alternative embodiments, more than one groove 542 (such as two grooves, three grooves, or even more) can be formed in the outer end 540 of the first section body 510, each of which includes a seal or sealing member located therein.

The outer end 540 also includes an alignment mechanism 590, which in this embodiment, is a pin, post, or dowel pin 590 that is inserted into a hole 592 formed in the surface of the outer end 540. The outer end 540 also includes one or more push-off bolt holes 595 that are formed therein and that can be used to assist with the separating of the first section 500 from the second section 600 when the sections of the fluid end component 400 are unfastened.

Also, the body 610 of the second section 600 includes an outer end 640 that has a surface that contains groove 615 (see FIG. 7). An end of the sleeve 625 that is inserted into the second section 600 is visible in FIG. 8. The outer end 640 also includes one or more push-off bolt holes 695 formed therein. The body 710 of third section 700 includes an outer end 740 as well. In this view, the internal threads 718 of the body 710 are shown. On the packing nut 800, the outer threads 832 that engage with threads 718 are also shown. The flange portion 834 of the packing nut 800 includes several holes 836 formed therein. The holes 836 can receive a lever or other tool during the assembly or disassembly of the packing nut 800 to or from the third section 700 to enable a user to leverage the lever or tool to assist with rotating the packing nut 800 along threads 718 and 832.

Turning to FIG. 9, an inner perspective exploded view of the fluid end component 400 is shown. The body 510 of the first section 500 includes an inner end or face 560 that has at least one push-off bolt hole 595 formed therein. Extending from the inner end or face 560 is the mounting portion 562 with a groove for a counterbore seal 564 formed therein. The counterbore seal 564 is a circumferential seal. Mounting portion 562 is inserted into the mounting hole on the fluid end casing 310. The body 610 of second section 600 includes and inner end or face 660 that has an alignment mechanism 692 which, in this embodiment, is a hole 692 that can receive a dowel pin or pin extending from the outer end 540 of the first section 500. The inner end 660 also includes a push-off bolt hole 695 formed therein. The body 710 of the third section 700 includes an inner end or face 760 that has an alignment mechanism 792 which, in this embodiment, is a hole 792 that can receive a dowel or pin extending from the outer end 640 of the second section 600. In this view, multiple alignment mechanisms or holes 792 are shown on the inner end 760. The inner end 760 also includes a push-off bolt hole 795 formed therein. The relative positions of the packing nut 800 and the packing 900 are also illustrated.

Turning to FIG. 10, partial cross-sectional views of the first section 500, the second section 600, and the third section 700 are shown. Some of the features of the sections 500, 600, and 700 previously described or illustrated are also shown in FIG. 10. The inner surface or wall 514 of the first section 500 defines a bore 516, which can be referred to alternatively as a central bore or inner bore. The groove 542 with the sealing member 544 is formed in the outer end 540 of the first section 500. Also illustrated are an alignment mechanism hole 592 containing a dowel or pin 590 and the push-off bolt hole 595. Similarly, the inner surface 627 of the sleeve 625 coupled to the second section 600 defines a bore 616 that has a central axis that is aligned with the central axis of the bore 516 of the first section 500. The outer end 640 of the second section 600 includes an alignment mechanism hole 692 containing a dowel or pin 690 and the push-off bolt hole 695.

The third section 700 has an inner surface 722 that is part of the second inner portion 720 of body 710. The inner surface 722 defines a bore 716 that has a central axis that is aligned with the central axes of bores 516 and 616. The first inner portion 712 of the body 710 contains the threads 718 as shown. In the inner end 760 of the third section body 710 is a groove 762 that is configured to receive a seal or sealing member 764. In alternative embodiments, the third section body 710 may include two or more grooves 762 formed in the inner end 760, each of which includes a seal or sealing member 764 therein. The sealing member 764 abuts against the outer end 640 of the second portion 600 when the third section 700 is placed proximate to the second section 600. The sealing member 764 can be any resilient material or member that prevent debris from passing between the second portion 600 and the third portion 700.

Figure 11:
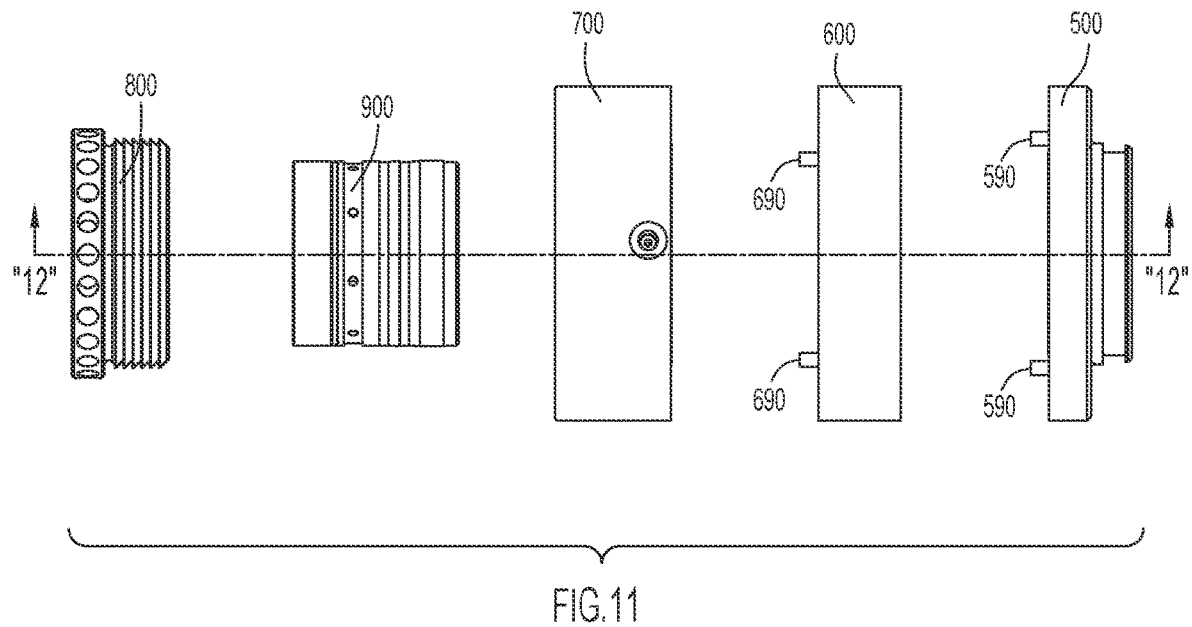
FIG. 11 is an exploded top view of the components of the fluid end component illustrated in FIG. 6.
Figure 12:
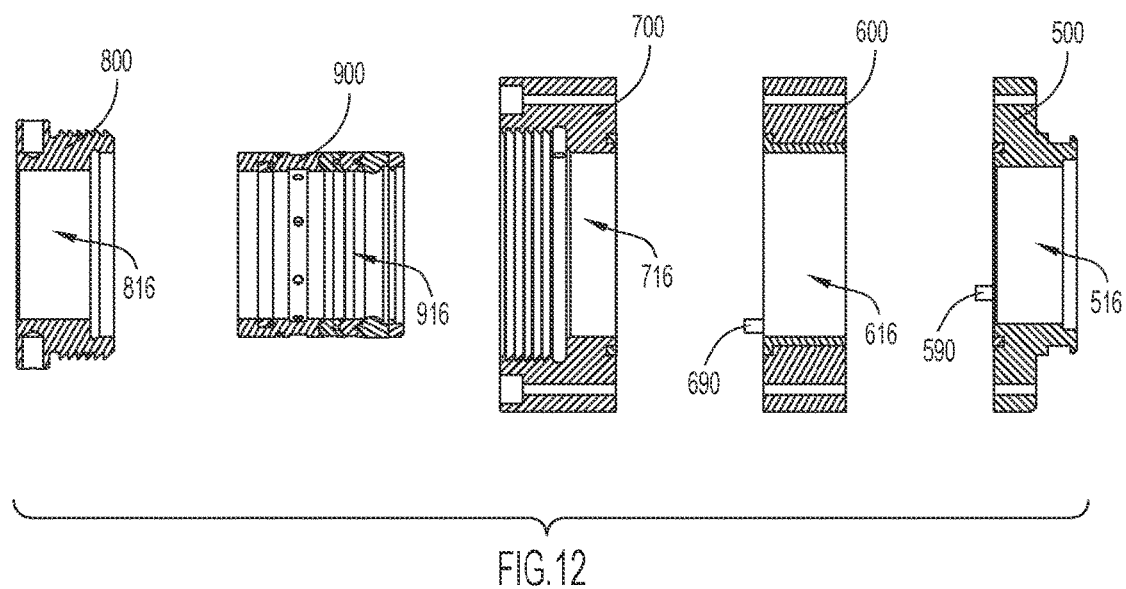
FIG. 12 is a cross-sectional side view of the components illustrated in FIG. 11 taken along the line "12-12" in FIG. 11.

Turning to FIGS. 11 and 12, exploded side views of the different components of the fluid end component 400 are illustrated. Each of the first section 500, the second section 600, the third section 700, the packing nut 800, and packing 900 is illustrated in its aligned position. The bores 516, 616, 716, 816, and 916 of the first section 500, the second section 600, the third section 700, the packing nut 800, and the packing 900, respectively, are illustrated. The bores 516, 616, 716, 816, and 916 are aligned when the sections 500, 600, and 700 are aligned, thereby maintaining the concentricity of the central bores so that a reciprocating member 335 can move back and forth therein.

The alignment mechanisms 590 and 690, which are dowels or pins, extending from the outer ends 540 and 640 of the first section 500 and the second section 600, respectively, are shown. Each of the alignment mechanisms 590 can be inserted into a corresponding alignment mechanism hole formed in the inner end 660 of the second section 600. Similarly, each of the alignment mechanisms 690 can be inserted into a corresponding alignment mechanism hole formed in the inner end 760 of the third section 700. As a result, when the first section 500, the second section 600, and the third section 700 are aligned, their push-off bolt holes are not aligned.

When the modular stuffing box 400 is to be assembled and mounted to the fluid end casing 310, the second section 600 is placed into contact with the first section 500 so that their cooperating alignment mechanisms are engaged to ensure the sections 500 and 600 are aligned. Next, the third section 700 is placed into contact with the second section 600 so that their cooperating alignment mechanisms are engaged to ensure the sections 600 and 700 are aligned. The packing 900 is inserted or slid into the bore of section 700 and into the sleeve 625 of section 600. The packing nut 800 is inserted into the bore of section 700 and threaded into a tightening position in which it holds the packing in place in the stuffing box 400. The assembled stuffing box 400 is positioned proximate to the fluid end casing 310 so that the mounting portion of the first section 500 is inserted into a mounting hole in the casing 310. Several fasteners are inserted into the through holes of sections 500, 600, and 700 and engaged with the casing 310 and tightened to securely hold and clamp the components of the modular stuffing box 400 in place.

To remove one of the sections of the modular stuffing box 400, the damaged section is identified and only the necessary sections starting from the outer end will be removed. If the packing nut 800 or the packing 900 is damaged, only the packing nut 800 needs to be removed. Either of the packing nut 800 and the packing 900 can be replaced with a similar material. If section 700 is the damaged section that needs to be repaired and/or replaced, once the fasteners 1000 are removed, section 700 can be removed utilizing a push-off bolt that is inserted into the push-off bolt hole in section 700. Either section 700 can be repaired or a new section that has similar properties to section 700 can used. The replacement section 700 is placed into engagement with the second section 600 and the fasteners 1000 reinserted into the through holes to secure the modular stuffing box components to the fluid end casing 310. If the second section 600 needs to be repaired or replaced, once the fasteners 1000 are removed, then the third section 700 and the second section 600 are removed. Once the repair or replacement process is completed, the repaired or new section 600 is placed into aligned engagement with the first section 500, and the third section 700 is placed into aligned engagement with the second section 600. The fasteners 1000 are then reinserted to secure the modular stuffing box to the casing 310. If the first section 500 needs to be repaired or replaced, the process is the same as that described above relating to the replacement of the second section except that the first section also needs to be removed so that it can be repaired or replaced.

It is to be appreciated that the modular stuffing box according to the present invention is not limited to only three sections. In different embodiments, a fourth section as well as a fifth section or even additional sections can be used to form the modular stuffing box.

It is also to be understood that the sealing assembly described herein, or portions thereof may be fabricated from any commonly used seal materials, such as homogeneous elastomers, filled elastomers, partially fabric reinforced elastomers, and full fabric reinforced elastomers. Suitable resilient elastomeric materials includes, but re not limited to, thermoplastic polyurethane (TPU), thermoplastic copolyester (COPE), ethylene propylene diene monomer (EPDM), highly saturated nitrile rubber (HNBR), reinforced versions of the foregoing materials, such as versions reinforced with fibers or laminations of woven material, as well as combinations of any of the foregoing materials.

While the invention has been illustrated and described in detail and with reference to specific embodiments thereof, it is nevertheless not intended to be limited to the details shown, since it will be apparent that various modifications and structural changes may be made therein without departing from the scope of the inventions and within the scope and range of equivalents of the claims. In addition, various features from one of the embodiments may be incorporated into another of the embodiments. Accordingly, it is appropriate that the appended claims be construed broadly and in a manner consistent with the scope of the disclosure as set forth in the following claims.

Similarly, it is intended that the present invention cover the modifications and variations of this invention that come within the scope of the appended claims and their equivalents. For example, it is to be understood that terms such as "left," "right," "top," "bottom," "front," "rear," "side," "height," "length," "width," "upper," "lower," "interior," "exterior," "inner," "outer" and the like as may be used herein, merely describe points of reference and do not limit the present invention to any particular orientation or configuration. Further, the term "exemplary" is used herein to describe an example or illustration. Any embodiment described herein as exemplary is not to be construed as a preferred or advantageous embodiment, but rather as one example or illustration of a possible embodiment of the invention.

Finally, when used herein, the term "comprises" and its derivations (such as "comprising", etc.) should not be understood in an excluding sense, that is, these terms should not be interpreted as excluding the possibility that what is described and defined may include further elements, steps, etc. Meanwhile, when used herein, the term "approximately" and terms of its family (such as "approximate," etc.) should be understood as indicating values very near to those which accompany the aforementioned term. That is to say, a deviation within reasonable limits from an exact value should be accepted, because a skilled person in the art will understand that such a deviation from the values indicated is inevitable due to measurement inaccuracies, etc. The same applies to the terms "about" and "around" and "substantially."

What is claimed is:

1. A modular stuffing box configured to be coupled to a fluid end casing of a reciprocating pump, comprising:
    a first section including a mounting portion engageable with an opening formed in the fluid end casing, the first section being a ring-shaped body and defining a bore therein, the first section having a first distal end and a second distal end opposite the first distal end;
    a second section separate from the first section, the second section being a ring-shaped body with an inner surface defining a bore therein, the second section including one of an abrasion-resistant sleeve or an abrasion-resistant coating on the inner surface, the abrasion-resistant sleeve or coating having a higher wear resistance than the second section, the second section having a third distal end and a fourth distal end opposite the third distal end, the third distal end of the second section being placed adjacent to the second distal end of the first section;
    a third section being a ring-shaped body and having an inner surface defining a bore therein, the third section having a fifth distal end and a sixth distal end opposite the fifth distal end, the fifth distal end of the third section being placed adjacent to the fourth distal end of the second section;
    a fastener engageable with each of the first section, the second section, the third section, and the fluid end casing to secure the first section, the second section, and the third section to the fluid end casing such that the bores of the first section, the second section, and the third section are aligned; and
    one or more packing seals located only in the bore of the second section, wherein each of the first section, the second section, and the third section is separate from and does not overlap with the others of the first section, the second section, and the third section.

2. The modular stuffing box of claim 1, wherein when the fastener is removed, any one of the first section, the second section, and the third section can be removed and replaced with a different section having the same features as the removed section.

3. The modular stuffing box of claim 1, wherein each of the first section, the second section, and the third section has a mounting hole that can receive the fastener.

4. The modular stuffing box of claim 1, wherein the first section includes a first alignment mechanism, the second section includes a second alignment mechanism engageable with the first alignment mechanism to ensure that the first section and the second section are aligned when they are positioned proximate to each other.

5. The modular stuffing box of claim 4, wherein the second section includes a third alignment mechanism, the third section includes a fourth alignment mechanism engageable with the third alignment mechanism to ensure that the second section and the third section are aligned when they are positioned proximate to each other.

6. The modular stuffing box of claim 1, wherein the third section includes a first inner portion defining a first inner surface and a second inner portion defining a second inner surface, the third section including a wall between the first inner portion and the second inner portion, and the first inner surface defines a plurality of threads.

7. The modular stuffing box of claim 6, further comprising:
    a packing nut engageable with the third section, the packing nut having an outer surface defining a plurality of threads, the plurality of threads on the packing nut being engageable with the plurality of threads on the third section to couple the packing nut to the third section and thereby retain the one or more packing seals in the modular stuffing box.

8. The modular stuffing box of claim 7, wherein the one or more packing seals are located inside the second section when the packing nut is coupled to the third section.

9. The modular stuffing box of claim 1, wherein the one or more packing seals are aligned with the inner surface of the second section.

10. The modular stuffing box of claim 1, wherein the mounting portion of the first section is located on the first distal end, and the mounting portion includes a circumferential seal.

11. The modular stuffing box of claim 1, wherein the second distal end includes a groove formed therein, and the first section includes a sealing member located in the groove.

12. A fluid end component that is mountable to a fluid end casing, the fluid end component comprising:
    a first ring-shaped component having an inner surface defining a first central bore, the first ring-shaped component having a first distal end and a second distal end opposite the first distal end;
    a second ring-shaped component having an inner surface defining a second central bore, the second ring-shaped component including one of an abrasion-resistant sleeve or an abrasion-resistant coating on the inner surface of the second ring-shaped component, the abrasion-resistant sleeve or coating having a higher wear resistance than the second ring-shaped component, the second ring-shaped component having a third distal end and a fourth distal end opposite the third distal end, the third distal end of the second ring-shaped component being placed adjacent to the second distal end of the first ring-shaped component;
    a third ring-shaped component having an inner surface defining a third central bore, each of the first ring-shaped component, the second ring-shaped component, and the third ring-shaped component being independent from each other, the third ring-shaped component having a fifth distal end and a sixth distal end opposite the fifth distal end, the fifth distal end of the third ring-shaped component being placed adjacent to the fourth distal end of the second ring-shaped component;

a plurality of fasteners engageable with each of the first ring-shaped component, the second ring-shaped component, and the third ring-shaped component to mount the first ring-shaped component, the second ring-shaped component, and the third ring-shaped component to the fluid end casing; and one or more packing seals retainable in the fluid end component and located only in the second central bore of the second ring-shaped component, wherein each of the first ring-shaped component, the second ring-shaped component, and the third ring-shaped component is separate from and does not overlap with the others of the first ring-shaped component, the second ring-shaped component, and the third ring-shaped component.

13. The fluid end component of claim 12, wherein the inner surface of the third ring-shaped component includes a plurality of threads, and the fluid end component further comprises:

a packing nut with a plurality of threads engageable with the plurality of threads on the third ring-shaped component to mount the packing nut to the third ring-shaped component and retain the one or more packing seals in the fluid end component.

14. The fluid end component of claim 12, wherein the first ring-shaped component and the second ring-shaped component include a first set of cooperating alignment mechanisms that engage each other when the first ring-shaped component and the second ring-shaped component are proximate each other, and the second ring-shaped component and the third ring-shaped component include a second set of cooperating alignment mechanisms that engage each other when the second ring-shaped component and the third ring-shaped component are proximate each other.

15. The fluid end component of claim 12, wherein the first central bore has a first diameter, the second central bore has a second diameter, and a portion of the third central bore has a third diameter, wherein the second diameter and the third diameter are the same and are larger than the first diameter.

16. The fluid end component of claim 12, wherein the first ring-shaped component has an end with a groove containing a sealing member that engages the second ring-shaped component when the first ring-shaped component and the second ring-shaped component are engaged with each other, and the third ring-shaped component has an end with a groove containing a sealing member that engages the second ring-shaped component with the third ring-shaped component and the second ring-shaped component are engaged with each other.

17. A stuffing box configured to be removably mounted to a fluid end casing of a reciprocating pump, the stuffing box comprising:

a first ring-shaped section with an inner wall defining a bore, the first ring-shaped section having a first distal end and a second distal end opposite the first distal end;

a second ring-shaped section with an inner wall defining a bore, the second ring-shaped section being separate from and movable proximate to the first ring-shaped section, the second ring-shaped section having a third distal end and a fourth distal end opposite the third distal end, the third distal end of the second ring-shaped section being placed adjacent to the second distal end of the first ring-shaped section;

a third ring-shaped section with an inner wall defining a bore, the third ring-shaped section being separate from and movable proximate to the second ring-shaped section, the third ring-shaped section having a fifth distal end and a sixth distal end opposite the fifth distal end, the fifth distal end of the third ring-shaped section being placed adjacent to the fourth distal end of the second ring-shaped section;

one or more packing seals locatable in the second ring-shaped section only; and a fastener engageable with each of the first ring-shaped section, the second ring-shaped section, and the third ring-shaped section so that the fastener can mount the first ring-shaped section, the second ring-shaped section, and the third ring-shaped section to a fluid end casing, wherein any of the first ring-shaped section, the second ring-shaped section, and the third ring-shaped section is removable and replaceable by a similarly structured section, and each of the first ring-shaped section, the second ring-shaped section, and the third ring-shaped section is separate from and does not overlap with the others of the first ring-shaped section, the second ring-shaped section, and the third ring-shaped section.

18. The stuffing box of claim 17, wherein the second ring-shaped section includes one of an abrasion-resistant sleeve or an abrasion-resistant coating on the inner wall of the second ring-shaped section, the abrasion-resistant sleeve or coating having a higher wear resistance than the second ring-shaped section, the inner wall of the third ring-shaped section includes threads, and the stuffing box further comprises:

a packing nut with threads engageable with the threads on the third ring-shaped section to secure the packing nut to the third ring-shaped section.

19. The stuffing box of claim 17, wherein each of the first ring-shaped section, the second ring-shaped section, and the third ring-shaped section includes an alignment mechanism that engages an alignment mechanism of an adjacent one of the first ring-shaped section, the second ring-shaped section, and the third ring-shaped section to align the bores of the first ring-shaped section, the second ring-shaped section, and the third ring-shaped section.

20. The stuffing box of claim 17, wherein the inner wall of the first ring-shaped section has a different surface and a different configuration than the inner walls of the second ring-shaped section and the third ring-shaped section.

* * * * *